July 24, 1962  J. LADELL  3,046,399
X-RAY SPECTROGRAPH
Filed Nov. 3, 1958

INVENTOR.
JOSHUA LADELL
BY
Frank R. Trifari
AGENT.

United States Patent Office

3,046,399
Patented July 24, 1962

3,046,399
X-RAY SPECTROGRAPH
Joshua Ladell, Flushing, N.Y., assignor to North American Philips Company, Inc., New York, N.Y., a corporation of Delaware
Filed Nov. 3, 1958, Ser. No. 771,621
5 Claims. (Cl. 250—51.5)

My invention relates to a fluorescent X-ray spectrograph and more particularly to an X-ray spectrograph which measures more than one element simultaneously rather than serially.

The art of fluorescent X-spectrography has been concerned chiefly with measuring one element at a time. Thus, in one form of spectrograph, a flat analyzing crystal is interposed between a specimen and a detector, the latter being mounted together with the crystal for rotation about the specimen. Since X-rays are diffracted in accordance with Bragg's law, which states:

$$n\lambda = 2d \sin \theta$$

where $n$ is the order of diffraction, $\lambda$ is the wave-length in Angstrom units, $d$ the crystalline interplanar spacing in Angstrom units, and $\theta$ is the angle between the radiation and the crystalline planes, and since $d$ is a constant, it is apparent that rotation of the crystal and detector will result in variations of $\theta$ which are related to wave-length $\lambda$. Thus, for any given wave-length there will exist an angular setting $\theta$ which will enable the detection of that wave-length to the exclusion of others and thereby enable identification of a particular element.

It is also apparent that this method has the disadvantage that in a material containing several elements, the entire angular range must be scanned and measurements made serially at each angle corresponding to a wavelength characteristic of each element—a time consuming and expensive procedure.

Another disadvantage of a spectrograph which is designed to scan the entire angular range serially is that it is incapable of conveniently distinguishing between harmonically related X-ray spectra.

It is accordingly an object of my invention to simultaneously detect and differentiate between wave-lengths of several different elements.

It is another object of my invention to provide a simple, inexpensive X-ray spectrograph for analyzing a material for the constituent elements thereof.

It is still another object of my invention to provide an X-ray spectrograph for rapidly and non-destructively determining the constituent elements of a material.

Another object of my invention is to enable anyone to record a plurality of wave-lengths at one time.

These and further objects of my invention will appear as the specification progresses.

In accordance with the invention, I employ a plurality of detectors arranged with respect to a diffracting crystal which is cut to diffract at different angles a plurality of wave-lengths generated by the constituent elements of a specimen of material when irradiated by X-rays. Each of the detectors are pointed toward the crystal although they necessarily do not have to be in the same plane, and detect a particular wave-length reflected by the crystal at the angle at which the detector is pointed at the crystal. Thus, it is possible to simultaneously detect a plurality of wave-lengths, each corresponding to a particular element in the material.

The invention will be described with reference to the accompanying drawing in which.

Figure 1:
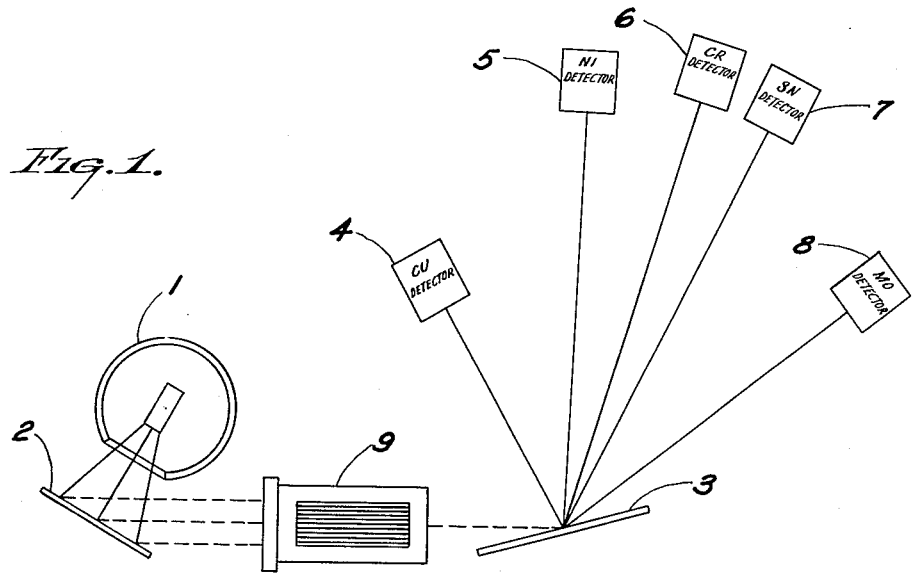
FIG. 1 is an X-ray spectrograph according to the invention.

A source of primary X-rays 1 is arranged to irradiate a specimen 2 of material which may contain several elements, e.g., Mo, Sn, Cu, Ni, Cr, etc. A specially prepared crystal 3, is spatially oriented relative to fluorescent X-rays, generated by the elements in the specimen, incident upon it. A finite number, N, detectors 4 to 8, are deployed each pointing to the crystal; each of these detectors simultaneously receiving diffracted X-radiation which is characteristic of one elemental constituent of the specimen matrix of N elements. A collimator 9, preferably of the parallel slit type, may be interposed between the specimen and the diffracting crystal 3 to limit the divergence of the emergent radiation from the irradiated specimen.

The principle used to cause simultaneous diffraction into N detectors is governed by satisfying the Laue condition for N characteristic radiations and at least N sets of crystallographic planes $(hkl)$. The simultaneous diffraction from N planes $(hkl)$ corresponding to N characteristic radiation $\lambda_j$ is accomplished by orienting a specially cut crystal in the following manner.

The three-dimensional reciprocal lattice of the crystal is constructed (see, for example, Clark, Applied X-rays, 3rd ed., page 294, et seq.). N spheres, each of radius $1/\lambda_j$ ($\lambda_j$ is the characteristic wave-length of the $j$th element, $j = 1, 2 \ldots$ N), are constructed with a common point of tangency. The common point of tangency of the N spheres is made to coincide with the origin of the reciprocal lattice. With the reciprocal lattice fixed in space, the line of centers of the spheres is rotated about any line drawn through the reciprocal lattice origin. When each and every sphere intersects, or nearly intersects with one reciprocal lattice point, the condition of simultaneous diffraction is satisfied; all planes $(hkl)$ represented by reciprocal lattice points are respectively in reflecting positions for the wave-lengths characterized respectively by the spheres; the direction of the line of centers is the direction of the incident beam and the orientation of the reciprocal lattice to this direction defines the orientation of the crystal relative to the direction of the incident beam. The directions of radii drawn from intersections of spheres and reciprocal lattice points define the directions in which the detectors must point to receive the diffracted rays (see FIG. 160, p. 296, Clark, supra).

The preparation of such a crystal involves (1) surface treatment to insure a mosaic character, (2) cutting of the crystal in such a manner as to avoid transmitted diffraction for long wave-lengths, and (3) optimizing of crystal thickness to provide adequate crystal volume for diffraction and low absorption from transmitted diffracted X-rays.

Figure 2:
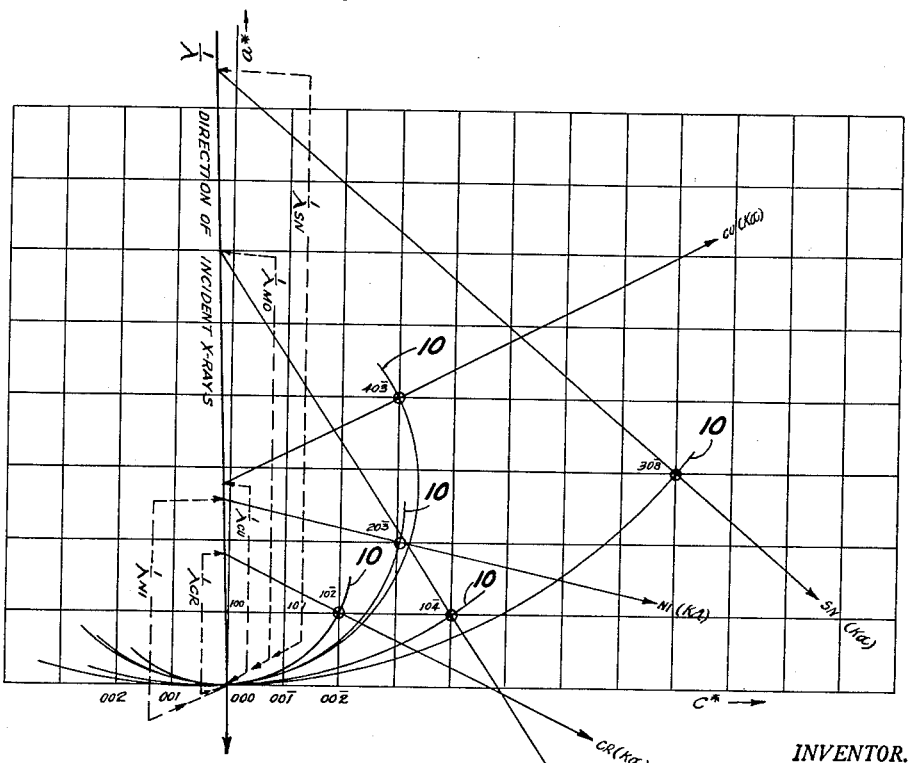
FIG. 2 is a diagram showing the principle underlying the invention.

An illustration of the foregoing principles is given in FIG. 2 which shows the reciprocal lattice construction of the $(ho l)$ zone of quartz. Circles 10 commonly tangent at the origin (OOO) are drawn with radii proportional to the reciprocal wavelengths $(1/\lambda)$ of the K$\alpha$ radiations of the elements Mo, Sn, Cu, Ni, and Cr (full circles are not shown). For the orientation of the X-ray incidence shown, these circles intersect, or nearly intersect the reciprocal lattice points ($10\bar{2}$): Cr sphere; ($20\bar{3}$): Ni sphere; ($40\bar{3}$): Cu sphere; ($10\bar{4}$): Mo sphere; and ($30\bar{8}$): Sn sphere.

The quartz crystal shown in FIG. 1, constructed in the above-described manner, is cut so that its surface is parallel to the (104) crystallographic planes. Consequently, the detectors 4 to 8 will be oriented to detect, separately but simultaneously, the K$\alpha$ radiations of Cr, Ni, Cu, Mo, and Sn, if present in the sample.

One advantage of this device is that harmonically related wave-lengths can be easily distinguished because the crystal can be oriented so that the reciprocal lattice points reflecting the harmonically related wave-lengths do not lie on a line passing through the origin of the reciprocal lattice.

Furthermore, the sensitivity and size of the detector can be tailored to the amount of the element in the matrix, i.e., large detectors can be used for small amounts of the element and vice versa, because there are no moving parts. Likewise, the device can be made extremely compact and vacuum tight.

Obviously, other crystals could be used, the cut of which is determined by the principles described hereinabove. Likewise, other details of the apparatus such as divergence limiting slits, collimators, electrical circuits for amplifying electrical signals produced by detectors which convert X-radiation into electrical signals, recording devices, and the like have been omitted for the sake of simplicity. Such devices are, of course, well-known and require no extended description. Similarly, as a source of primary X-rays radioactive materials may be used, if desired.

While I have thus described my invention with a specific example and a specific embodiment, I do not wish to be limited thereto, the invention being defined in the appended claims which should be broadly construed.

What I claim is:

1. An X-ray spectrograph for determining the elements of a material comprising a source of X-rays, means for positioning a specimen of the material to be irradiated in the path of a beam of X-rays, a stationary diffracting crystal positioned to receive emergent radiation from the irradiated specimen, said crystal having a plurality of diffracting planes for reflecting each of a plurality of wave-lengths into a plurality of fixed detectors each of which is pointed at the crystal in the direction of a radius drawn from the intersection of a sphere of reflection and a reciprocal lattice point, said sphere of reflection corresponding to one of said wave-lengths and having a radius equal to the reciprocal of said wave-length.

2. An X-ray spectrograph for determining the elements of a material comprising a source of X-rays, means for positioning a specimen of the material to be irradiated in the path of a beam of X-rays, a stationary diffracting crystal positioned to receive emergent radiation from the irradiated specimen, said crystal having a plurality of diffracting planes for reflecting each of a plurality of wave-lengths into a plurality of fixed detectors each of which is pointed at the crystal in the direction of a radius drawn from the intersection of a sphere of reflection and a reciprocal lattice point, said sphere of reflection corresponding to one of said wave-lengths and having a radius equal to the reciprocal of said wave-length.

3. An X-ray spectrograph for determining the elements of a material comprising a source of X-rays, means for positioning a specimen of the material to be irradiated in the path of a beam of X-rays, a stationary quartz crystal positioned to receive emergent radiation from the irradiated specimen, said crystal having a plurality of diffracting planes for reflecting each of a plurality of wave-lengths into a plurality of fixed detectors each of which is pointed at the crystal in the direction of a radius drawn from the intersection of a sphere of reflection and a reciprocal lattice point, said sphere of reflection corresponding to one of said wave-lengths and having a radius equal to the reciprocal of said wave-length.

4. An X-ray spectrograph for determining the elements of a material comprising a source of X-rays, means for positioning a specimen of the material to be irradiated in the path of a beam of X-rays, a stationary quartz crystal positioned to receive emergent radiation from the irradiated specimen, said crystal having a reflecting surface parallel to its (104) crystallographic plane and having a plurality of diffracting planes for reflecting each of a plurality of wave-lengths into a plurality of fixed detectors each of which is pointed at the crystal in the direction of a radius drawn from the intersection of a sphere of reflection and a sphere of reflection corresponding to one of said wave-lengths and having a radius equal to the reciprocal of said wave-length.

5. An X-ray spectrograph for determining the elements of a material comprising a source of X-rays, means for positioning a specimen of the material to be irradiated in the path of a beam of X-rays, collimating means for limiting the divergence of emergent radiation from the irradiated specimen, a stationary diffracting crystal positioned to receive emergent radiation from the irradiated specimen, said crystal having a plurality of diffracting planes for reflecting each of a plurality of wave-lengths into a plurality of fixed detectors each of which is pointed at the crystal in the direction of a radius drawn from the intersection of a sphere of reflection and a reciprocal lattice point, said sphere of reflection corresponding to one of said wave-lengths and having a radius equal to the reciprocal of said wave-length.

References Cited in the file of this patent

UNITED STATES PATENTS

| 2,819,405 | Bond | Jan. 7, 1958 |
| 2,835,820 | Birks | May 20, 1958 |
| 2,842,670 | Birks | July 8, 1958 |
| 2,928,945 | Arndt | Mar. 15, 1960 |

FOREIGN PATENTS

| 404,808 | Germany | Oct. 21, 1924 |

UNITED STATES PATENT OFFICE
CERTIFICATE OF CORRECTION

Patent No. 3,046,399                          July 24, 1962

Joshua Ladell

It is hereby certified that error appears in the above numbered patent requiring correction and that the said Letters Patent should read as corrected below.

Column 3, lines 34 and 47, and column 4, lines 9, 23 and 38, after "reflection", each occurrence, insert -- tangent to the origin of the reciprocal lattice of the crystal --; column 4, line 24, after "a" insert -- reciprocal lattice point, said --.

This certificate supersedes the certificate of correction issued April 23, 1963.

Signed and sealed this 19th day of November 1963.

(SEAL)
Attest:

ERNEST W. SWIDER
Attesting Officer

EDWIN L. REYNOLDS
Acting Commissioner of Patents